United States Patent
Scharfe et al.

(10) Patent No.: US 10,229,531 B2
(45) Date of Patent: Mar. 12, 2019

(54) METHOD AND DEVICE FOR TESTING A CONTROL UNIT

(71) Applicant: dSPACE digital signal processing and control engineering GmbH, Paderborn (DE)

(72) Inventors: Carsten Scharfe, Paderborn (DE); Thorsten Pueschl, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 352 days.

(21) Appl. No.: 14/722,602

(22) Filed: May 27, 2015

(65) Prior Publication Data
US 2015/0346716 A1    Dec. 3, 2015

(30) Foreign Application Priority Data

May 27, 2014 (EP) .................................. 14169948

(51) Int. Cl.
*G06T 15/80* (2011.01)
*G06F 11/27* (2006.01)
(Continued)

(52) U.S. Cl.
CPC .............. *G06T 15/80* (2013.01); *G05B 17/02* (2013.01); *G05B 23/0256* (2013.01);
(Continued)

(58) Field of Classification Search
None
See application file for complete search history.

(56) References Cited

U.S. PATENT DOCUMENTS

2012/0210385 A1   8/2012   Cirstea et al.
2013/0021445 A1*  1/2013   Cossette-Pacheco ......................
                                          G06T 17/20
                                          348/46
(Continued)

FOREIGN PATENT DOCUMENTS

EP           1 806 636 A1    7/2007
WO       WO 2011/023203 A1   3/2011
WO       WO 2011/023204 A1   3/2011

OTHER PUBLICATIONS

"Lidar Simulation Using Graphics Hardware Acceleration", Peinecke et al., published in 2008.*
"Lidar Simulation Using Graphics Hardware Acceleration", Peinecke et al., published in 2008 (Year: 2008).*
European Search Report for European Application No. 14169948.8 dated Jul. 30, 2014 with English translation.
(Continued)

*Primary Examiner* — James G Norman
(74) *Attorney, Agent, or Firm* — Muncy, Geissler, Olds & Lowe, P.C.

(57) ABSTRACT

A method and a device for testing a control unit, in which sensor data are transmitted over a network connection to a real or simulated control unit, which data are calculated by a data processing system using simulation, in which the simulation of the sensor data takes place at least in part with at least one graphics processor of at least one graphics processor unit of the data processing system. The simulated sensor data are encoded in image data that are output via a visualization interface to a data conversion unit that simulates a visualization unit connected to the visualization interface. Via the data conversion unit the received image data are converted into packet data containing the sensor data through the network connection to the control unit.

15 Claims, 1 Drawing Sheet

(51) Int. Cl.
*G05B 23/02* (2006.01)
*G05B 17/02* (2006.01)

(52) U.S. Cl.
CPC .... *G06F 11/27* (2013.01); *G05B 2219/23445* (2013.01); *G05B 2219/23446* (2013.01); *G05B 2219/2637* (2013.01); *G06T 2210/32* (2013.01)

(56) References Cited

U.S. PATENT DOCUMENTS

| | | | |
|---|---|---|---|
| 2014/0218379 A1* | 8/2014 | Jia | G06T 1/20 345/520 |
| 2015/0199458 A1* | 7/2015 | Bacon | G06F 17/5009 703/8 |

OTHER PUBLICATIONS

Lu et al., "A GPU based real-time SAR simulation for complex scenes," paper, Dept. of Electronic Eng., Shanghai Jian Tong University, pp. 1-4.

Peinecke et al., "Lidar Simulation using Graphics Hardware Acceleration," 27th IEEE Digital Avionics Systems Conf., pp. 4.D4-1-4.D4-8 (Oct. 2008).

Paul Brewster, "Flash LIDAR Emulator for HIL Simulation," Presentation to NASA Langley Research Center ModSim World Conf., pp. 1-27 (Oct. 14, 2010).

Wang et al., "Shader-based Sensor Simulation for Autonomous Car Testing," 2012 15th Int'l IEEE Conf. on Intelligent Trans. Sys., pp. 224-229 (Sep. 2012).

\* cited by examiner

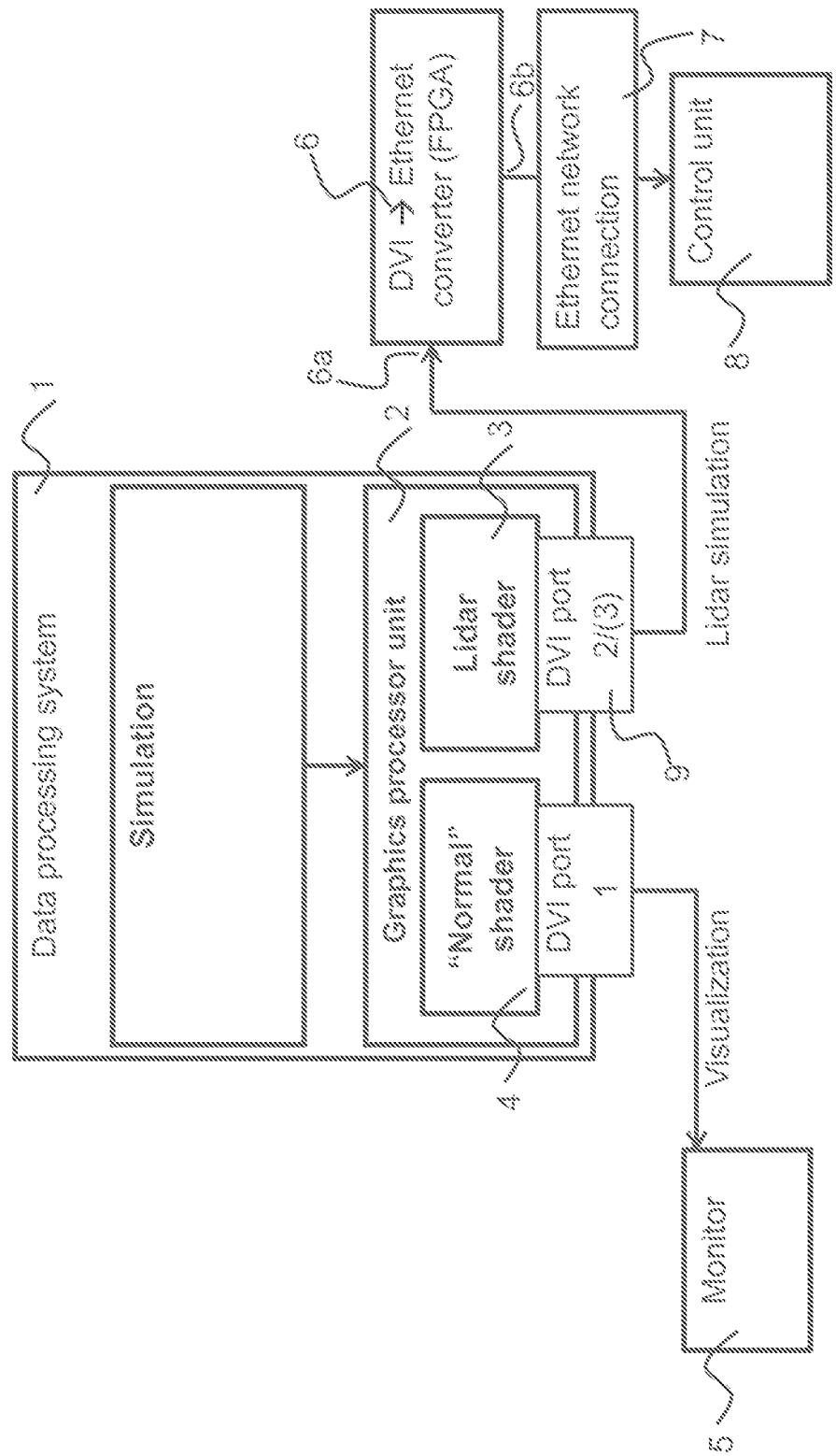

METHOD AND DEVICE FOR TESTING A CONTROL UNIT

This nonprovisional application claims priority under 35 U.S.C. § 119(a) to European Patent Application No. EP 14169948.8, which was filed on May 27, 2014, and which is herein incorporated by reference.

BACKGROUND OF THE INVENTION

Field of the Invention

The present invention relates to a method for testing a control unit, in which sensor data are transmitted over a network connection to a real or simulated control unit, which data are calculated via a data processing system using simulation. In addition, the invention also relates to a sensor data simulator for simulating data of a sensor to test control units that process the simulated data, comprising a data processing system having at least one graphics processor unit.

Description of the Background Art

Methods and devices of this type are known in the prior art, especially in the field of automotive component supply. Such methods are known as HIL—hardware in the loop, or SIL—software in the loop. In these methods, either actual, technical control units or simulated control units are tested in that simulated sensor data are passed to them over a network connection as though the control units were installed in an actual motor vehicle and acquire environmental data detected by sensors or other measurement data, in particular in real time. Control units can thus be functionally tested in this way with no need to perform actual test drives, which is advantageous especially in the preproduction stage. A simulated control unit can be, for example, a computer that in technical terms behaves like an actual control unit because of software running on it.

It is also known in other fields to have computationally intensive system-internal tasks performed not only by the main processor of a data processing system, but also to use the computing capacity of a graphics processor of a graphics processor unit of the data processing system for these tasks, since these processors are very powerful and in some cases are also present in a parallel architecture, and are not fully utilized by their visualization tasks, and thus represent a hardware resource that can be used in an ancillary or even primary manner for computing tasks.

After calculation in this context, the data calculated by graphics processors are transmitted from the memory of a graphics processor unit into the main memory of the data processing system, which is the only place they are further processed.

In the field of control unit testing using simulated environmental and/or sensor data, in contrast, the graphics processors of the data processing systems have not hitherto been used for simulation purposes, since there were no adequately fast transmission paths available to provide the calculated data from a graphics processor unit to the control units under test. Transmission of the calculated data from the graphics processor unit first into the main memory of the data processing system for the purpose of forwarding through network connections has hitherto cancelled out any speed advantage in the calculation.

SUMMARY OF THE INVENTION

It is therefore an object of the present invention to provide a method and device with which tests for control units are made possible with the utilization of at least one graphics processor of at least one graphics processor unit. In particular, even new, more computationally intensive simulation applications should be made accessible in this way.

This object is attained in an embodiment according to the invention in which a simulation of the sensor data takes place at least in part with at least one graphics processor of at least one graphics processor unit of the data processing system, and the simulated sensor data are encoded in image data that are output via a visualization interface to a data conversion unit, and via the data conversion unit the received image data are converted into packet data containing the sensor data, which are transmitted in a packet-based manner, in particular according to the TCP/IP protocol, from the data conversion unit through the network connection to the control unit. The encoding of the simulated sensor data in image data to be output can be performed directly by the at least one graphics processor unit, in particular by at least one graphics processor of such a unit.

Thus, it is intended to exploit the speed advantage of at least one graphics processor unit in the simulation of sensor data, which is to say to calculate these data by at least one graphics processor, or, if applicable, multiple graphics processors working in parallel, in the at least one graphics processor unit, and to now make these sensor data accessible to control units under test directly through a standard interface for visualization to the outside world.

To this end, the invention provides for the image data that contain the encoded sensor data and that are output through the visualization interface to be converted by a data conversion unit into network data, or in other words network data packets containing the simulation data, which packets can be received by the control unit through its at least one data input. For transmission over the network connection, it is possible to use, e.g., the TCP/IP protocol, the UDP/IP protocol, or else any other suitable protocol.

In an embodiment, the visualization interface used to output the simulated sensor data can be an integral physical part of the at least one graphics processor unit that simulates the sensor data. Internal transmission paths upstream of transmission to the control unit are thus bypassed, and the simulation data are made directly available.

When multiple graphics processor units, if applicable, are used in the data processing system, in contrast, each of the graphics processor units does not need a separate visualization interface. If the simulation is performed on only one graphics processor unit or with only one graphics processor, then it is advantageous for at least the particular graphics processor unit performing the simulation to have a separate visualization interface, preferably as a physically associated hardware component that is structurally integrated.

In contrast, if multiple graphics processor units are employed for the simulation, the invention can also provide for the image data in which the sensor data are encoded to be output only through a visualization interface that is associated with only one of the multiple graphics processor units, in particular as a physically integral hardware component.

Here, the invention can additionally provide that the specific visualization interface of the specific graphics processor unit that has the highest computational load of all graphics processor units used for the simulation is used to output the image data. This graphics processor unit can also be used for encoding the sensor data in image data. The other graphics processor units with lower computing loads that are used in the simulation can transmit the simulation data they have calculated through, e.g., internal transmission paths to the graphics processor unit performing the output. In this way, any transmission paths that may be needed in parallel processing are limited to small quantities of data.

If the other graphics processor units used for the simulation have separate visualization interfaces, the invention can provide that they are not used for simulation data output in accordance with the invention. In contrast, these visualization interfaces can be used for other customary visualizations such as for monitor output.

Provision can be made according to an embodiment of the invention for the data conversion unit to simulate a visualization unit, for example, a display, a monitor, a screen, etc., connected to the visualization interface, wherein this simulation takes place in particular with respect to the graphics processor unit that is associated with the visualization interface performing the output, in particular the graphics processor unit of which the visualization interface is a physical part, which is to say that in this embodiment the data conversion unit passes itself off by technical means as, e.g., a monitor, in order to initiate output of the data.

An embodiment of this nature can be advantageous especially when the at least one graphics processor unit used for the simulation itself checks a visualization interface that is associated therewith at least logically, and if applicable and preferably also physically, for the presence of compatible connected visualization devices, and adapts the interface and encoding of image data for a detected visualization unit, for example with regard to image resolution and/or frame rate.

Since the transmission rate would be sharply limited in the customary visualization mode with a frame rate of 50 or 60 Hz, the invention can provide here that the encoding and output of the image data with sensor data encoded therein takes place with frame rates above these customary standard frame rates that are used pursuant to applicable standards such as, e.g., PAL or NTSC. For example, frame rates above 500 Hz, preferably above 1000 Hz, are chosen.

The invention can provide such a technically extreme frame rate because actual visualization of the image data containing the simulated sensor data does not take place, at least not through the visualization interface that according to the invention is used for purposes other than originally intended, and the extreme increase in the frame rate only serves to increase the data transmission rate.

In this regard, it can be advantageous here for the data conversion unit to simulate, in particular to the graphics processor unit, a connected visualization unit that has the capability of visualizing image data at this frame rate, in particular without this actually being the case. The visualization interface of the at least one graphics processor unit is thus used within the scope of the invention for purposes other than originally intended.

A sensor data simulator as a device according to the invention can have a data conversion unit connected to a visualization interface (in particular that is associated at least logically, and if applicable and preferably also physically, with at least one graphics processor unit), in particular to a VGA, DVI, or HDMI port, wherein the data processing system, in particular the at least one graphics processor unit thereof, is configured to encode simulated sensor data in image data, and output it through the visualization interface to the data conversion unit with which the received data can be converted into data packets containing the simulation data, which data packets can be output to a network interface, in particular according to the TCP/IP standard.

A corresponding device according to an embodiment of the invention can be composed of a data conversion unit comprising a receiving interface for connection to a visualization interface of a data processing system that is associated at least logically, and if applicable and preferably also physically, with a graphics processor unit and a transmitting interface for the output of data packets of a packet-based network protocol, wherein the data conversion unit is configured to convert payload data encoded in image data that can be received through the receiving interface into network data packets containing the payload data that can be transmitted through the transmitting interface.

Here, the data conversion unit can also be further configured to hold available in internal storage operating parameters such as, e.g., the frame rate to be used, and to transmit them upon connection to a visualization interface of the data processing system that carries out the simulation so that the system, in particular at least one graphics processor unit thereof, configures itself accordingly.

It remains also advantageous in the application of the invention that especially computationally intensive real-time applications are made available in the simulation by this means. For example, provision can be made to simulate, using the data processing system or the at least one graphics processor unit thereof, the sensor data from a LIDAR (Light Detection and Range) sensor, which are used in automotive applications, for example in self-steering vehicles. Even though the invention can be used in this application, it is not limited thereto.

Here the invention can provide that the data processing system, in particular the at least one graphics processor unit thereof, is used to simulate not only a 3D scene of a surrounding environment, but also the acquisition of measurement signals from this scene by a likewise simulated LIDAR sensor that is positioned in the scene and that is moved in the simulated scene by a motor vehicle, for example. Control units for LIDAR sensors can be tested in this way without the need to need to perform actual test drives and also without the actual existence of the LIDAR sensor.

The simulation of the sensor data can be accomplished via shaders, for example, which can be implemented in software, in particular on the at least one graphics processor unit, in particular are executed by at least one graphics processor of the graphics processor unit. A shader is known to one skilled in the art to be a program that tells a computer how to draw something in a specific and unique way.

It is also possible to implement the functionality of a shader in a hardware circuit, for example as an application-specific integrated circuit (ASIC).

A graphics processor unit can be a unit that is not only an integral part of a data processing system, in particular of the motherboard thereof, but that can also alternatively be implemented as a separate unit that is removable from the data processing system, in particular as a plug-in card, wherein each graphics processor unit has at least one graphics processor and can have at least one graphics memory of its own. The graphics processor unit can also have at least one visualization interface at least logically associated therewith that can serve to output image data to a visualization unit, e.g. a monitor. Preferably a visualization interface of a graphics processor unit is also directly physically associated with the graphics processor unit, which is to say an integral hardware component of such a unit. At least in the case of such a graphics processor unit, no additional data transmission paths for the simulated sensor data within the data processing system but outside the graphics processor unit are then required.

The sensor data of a LIDAR sensor, which is to say, e.g., the distances and reflection or brightness values and, if applicable, angular positions, can then be encoded in the image data to be output through the visualization interface in this application. For example, the distance values of the simulated LIDAR sensor can be encoded at the position of the color values that otherwise are customarily present in image data.

The conversion by the data conversion unit of the sensor data encoded in the received image data can be a software-based process, for example, but in an embodiment it can be carried out by an integrated circuit that is connected to the visualization interface, in particular to a DVI or HDMI port, wherein a logic circuit is programmed into the circuit. Such a circuit can be implemented as an FPGA.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DRAWING DESCRIPTION

The present invention will become more fully understood from the detailed description given hereinbelow and the accompanying drawing which is given by way of illustration only, and thus, is not limitive of the present invention, and wherein the sole FIGURE illustrates an an exemplary embodiment of the invention in the application for LIDAR sensors is described below with reference to the FIGURE.

DETAILED DESCRIPTION

FIG. 1 symbolically shows a data processing system 1 on which a 3D environment scene is simulated, here a scene of a driving motor vehicle. Also simulated is a LIDAR sensor carried by the motor vehicle that senses the environment around the vehicle by measurement in the simulation. The calculation of the measurement values of the LIDAR sensor in the simulation is performed on the basis of the simulated environment data using at least one graphics processor of a graphics processor unit 2 of the data processing system 1. The simulation of the 3D environment scene can also be calculated on a different data processing system than the simulation of the LIDAR sensor. Environment data and sensor data can also both be calculated/simulated with the graphics processor unit 2. In the simulation of at least the sensor data, this graphics processor unit 2 can use a shader 3 that is used only to encode the simulated sensor data of the LIDAR in image data and to output it through a visualization interface 9, e.g., a DVI port, display port, HDMI port, etc. for example with a frame rate that is increased greatly relative to the PAL or NTSC standard, e.g., 1000 Hz. An additional shader 4 can be operated in parallel in the graphics processor unit 2 to carry out normal visualization of the simulated scene, for example on a monitor 5. The shader 3 is a program that tells the computer how to draw an image that looks like it is produced by a lidar sensor.

A data converter 6 is used, which is implemented by way of example here as an FPGA (Field Programmable Gate Array), or can be an ASIC (application-specific integrated circuit), a microprocessor, etc., which receives the image data through its receiving interface 6a and by which the sensor data received as image data are converted into network packets containing the sensor data, e.g., for an Ethernet network connection 7, through which the control unit 8 under test of a LIDAR sensor receives these simulated data transmitted through the transmitting interface 6b.

Output of the simulated sensor data directly from the graphics processor unit 2 through its standard visualization interface 9 that is used for a purpose other than originally intended avoids internal transmission paths in the data processing system 1 so that even computationally intensive real-time applications, such as the simulation of LIDAR sensor data here, are made available by the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for testing a control unit, the method comprising:
providing:
a data processing system with at least one graphics processor unit for image processing and a visualization interface for transmitting image data, the at least one graphics processor unit having at least one graphics processor;
a data converter connected to the data processing system via the visualization interface and a receiving interface, wherein the data converter transmits operating parameters to the data processing system; and
a network connection, the control unit connected to the data converter via the network connection;
providing a simulated environment scene to the data processing system;
generating simulated sensor data from the simulated environment scene using simulation by the at least one graphics processor of the at least one graphics processor unit of the data processing system;
encoding the simulated sensor data in the image data;
encoding distance values of a simulated LIDAR sensor in the image data in place of color values;
directly outputting the image data via the visualization interface to the data converter through the receiving interface;
converting received image data by the data converter into packet data containing the simulated sensor data; and
transmitting the packet data through the network connection to the control unit.

2. The method according to claim 1, wherein the encoding of the simulated sensor data in the image data takes place with a frame rate greater than 500 Hz or greater than 1000 Hz, and wherein a data conversion unit simulates a visualization unit that has the capability of visualizing image data at the frame rate greater than 500 Hz or greater than 1000 Hz.

3. The method according to claim 1, wherein sensor data of the simulated LIDAR sensor are simulated using the data processing system via a shader implemented in software on the basis of a 3D environment scene that is likewise simulated by the data processing system or by another data processing system.

4. The method according to claim 3, wherein the sensor data of the simulated LIDAR sensor comprise reflection or brightness values and angular position values.

5. The method according to claim 3, further comprising:
carrying out visualization of the simulated environment scene by operating an additional shader in parallel with the shader.

6. The method according to claim 1, wherein the data converter is formed as an integrated circuit that is connected to the visualization interface, and wherein the integrated circuit comprises a logic circuit or is implemented as an FPGA.

7. The method according to claim 1, wherein the simulated sensor data is transmitted through the network according to a TCP/IP or UDP/IP protocol.

8. A sensor data simulator system for simulating data of a sensor to test control units that process the simulated data, the sensor data simulator system comprising:

a data processing system having at least one graphics processor unit for image processing and a visualization interface for transmitting image data;

a data converter connected to the data processing system via a receiving interface, wherein the data converter transmits operating parameters to the data processing system, includes the receiving interface for connection to the visualization interface of the data processing system and a transmitting interface for the output of data packets of a packet-based network protocol, and converts payload data encoded in the image data that are received through the receiving interface into network data packets containing the payload data that are transmitted through the transmitting interface; and a control unit connected to the data converter via a network connection, wherein the at least one graphics processor unit of the data processing system is configured to generate the simulated data from a simulated environmental scene and the image data, encode at least a portion of the simulated data in the image data, and encode distance values of a simulated LIDAR sensor in the image data in place of color values, the data processing system is configured to directly output the image data from the at least one graphics processor unit, through the visualization interface, to the data converter, the image data is received and converted by the data converter into data packets containing the simulated data, and the data packets containing the simulated data are output to the network connection to the control unit.

9. The sensor data simulator system according to claim 8, wherein the data packets are output to a network interface according to a TCP/IP standard.

10. The sensor data simulator system according to claim 8, wherein the data converter is formed as an integrated circuit that is connected to the visualization interface, and wherein the integrated circuit comprises a logic circuit or is implemented as an FPGA.

11. The sensor simulator system according to claim 8, wherein the sensor simulator system is used for automotive applications.

12. The sensor simulator system according to claim 11, wherein the automotive applications comprise self-steering vehicles.

13. The sensor simulator system according to claim 8, wherein the visualization interface comprises a DVI port, a display port, or an HDMI port.

14. The sensor simulator system according to claim 8, wherein the at least one graphics processor unit of the data processing system is further configured to encode reflection or brightness values and angular position values of the simulated LIDAR sensor.

15. The sensor simulator system according to claim 8, further comprising a shader implemented in software based on a 3D environment scene.

* * * * *